United States Patent [19]

Goncalves

[11] Patent Number: 4,522,317
[45] Date of Patent: Jun. 11, 1985

[54] DOSAGE DISPENSER DEVICE FOR A VISCOUS PRODUCT

[75] Inventor: Antonin Goncalves, Groslay, France

[73] Assignee: L'Oreal, Paris, France

[21] Appl. No.: 488,982

[22] Filed: Apr. 27, 1983

[30] Foreign Application Priority Data

May 6, 1982 [FR] France .................... 82 07900

[51] Int. Cl.³ ............................................ B67D 5/42
[52] U.S. Cl. ................................... 222/391; 222/511;
222/532; 222/559; 74/128
[58] Field of Search ................ 222/391, 386, 96, 387,
222/511, 505, 509, 320, 531, 532, 545, 556, 559,
561, 513, 405, 526; 74/128

[56] References Cited

U.S. PATENT DOCUMENTS

| | | | |
|---|---|---|---|
| 949,545 | 2/1910 | Muller | 222/391 |
| 1,375,954 | 4/1921 | Doyle | 222/391 |
| 1,876,452 | 9/1932 | Gusdorf | 222/96 |
| 1,930,821 | 10/1933 | Newcomer et al. | 222/96 |
| 1,950,099 | 3/1934 | Cornell, Jr. et al. | 222/391 |
| 3,217,933 | 11/1965 | Watson, Jr. | 222/96 |
| 4,223,809 | 9/1980 | Martin | 222/96 |

FOREIGN PATENT DOCUMENTS

| | | |
|---|---|---|
| 28727 | 10/1980 | European Pat. Off. . |
| 836556 | 4/1938 | France . |
| 2160123 | 5/1973 | France . |
| 2509979 | 7/1981 | France . |
| 2509980 | 7/1981 | France . |
| 2509981 | 7/1981 | France . |

*Primary Examiner*—Joseph J. Rolla
*Assistant Examiner*—Andrew Jones
*Attorney, Agent, or Firm*—Cushman, Darby & Cushman

[57] ABSTRACT

A dosage dispenser comprises a rack having a one-way engagement connection with a piston slidable in a barrel. Reciprocation of the rack is actuated by an obliquely movable slide cammingly engaging the rack and results in incremental advance of the piston to dispense the product, for example toothpaste. The slide is alongside the discharge end of the barrel so the product can be aimed accurately.

4 Claims, 5 Drawing Figures

DOSAGE DISPENSER DEVICE FOR A VISCOUS PRODUCT

BACKGROUND OF THE INVENTION

The present invention concerns a dosage dispenser device for a viscous product intended to dispense given doses of a paste, a toothpaste in particular, of a cream or similar items.

PRIOR ART

There are already known (see in particular the French Patent Application Nos. 81-14131, 81-14132 and 81-14133 all filed on the July 21st, 1981 and assigned to the assignees of this invention) various dosage dispensers wherein a piston is driven in a cylindrical barrel in order to progressively displace the product to be dispensed. The movement of the piston is ensured by a rack which, when displaced in one direction, entrains the piston and when displaced in the other direction, does not entrain the piston because of the presence of suitable one-way drive means which then release the piston from the rack. Successive actuations of the rack produce successive displacements of the piston and the dispensing of successive doses of the product. In these devices, the actuation of the piston is generally effected at one end of the barrel and the product is dispensed at the other end. The dispensing opening is often disposed along the barrel axis so that the product is dispensed along this axis, or may be in a slightly off center position.

These known devices, although allowing the dispensing of accurate doses of the viscous product, have several drawbacks. Firstly, the product is dispensed at the opposite end from the end of actuation so that, when the dispenser is held in the hand and the piston is displaced by means of a finger, the product is dispensed at a certain distance and the force exerted by the hand has a tendency to cause the dispensing end of the product to waver so that the positioning of the product, for instance on a toothbrush, is difficult. Then, the fact that the product is being dispensed along the barrel axis or parallel to this axis obliges the user to turn his hand through 90° to be able to dispense the product conveniently. Finally, the closing of the dispensing opening requires the withdrawal and positioning of a stopper before and after the dispensing step.

OBJECTS OF THE INVENTION

It is an object of the present invention to provide a dosage dispenser device for a viscous product, of such a design that the actuation means and the dispensing opening for the product are located at the same end of the barrel so that the application of the product at the required place, for instance on a toothbrush, is very simple and convenient.

It is a further object of this invention to provide a dispensing device wherein the movement of actuation of the dispensing is effected in a transverse direction in relation to the barrel axis and may therefore be ensured by the simple displacement of one finger whilst the rest of the hand is gripping the barrel.

It is also desirable to provide a dispenser device which does not require any stopper, since the actuation of the dispensing produces the opening of the dispensing aperture and then its automatic closure.

Finally, it is an object to provide a dosage dispenser device wherein the viscous product contained within the barrel is separated from the outer atmosphere by a double closure.

SUMMARY OF THE INVENTION

More particularly, the invention concerns a dosage dispenser device for a viscous product which comprises a cylindrical barrel intended to contain the product to be dispensed, a piston intended to slide in a leakproof manner within the barrel, a rack disposed within the barrel and intended to be displaced parallel to the barrel axis between two positions, actuation means intended to displace the rack between its two positions, and a catch integral with the piston mounted on the rack and intended to transmit the displacements of the rack to the piston when the rack is displaced in a first direction along its length and to slide along the rack when it is displaced in the second direction; in accordance with the invention, the actuation means for the rack comprises a slide intended to be displaced in a first transverse direction having a first slope in relation to the barrel axis and the dispenser device, moreover, comprises a first assembly comprising a first element forming a cam and a first element forming a cam follower, the cam having a guide surface which is disposed in a second transverse direction having a second slope in relation to the barrel axis, this second slope being different from the first, one of the elements of the said first assembly being integral with the slide and the other with the rack.

It is advantageous for the cam to comprise two guide surfaces intended to be in contact with the cam follower when the slide is displaced in the first direction and in the second direction respectively.

The slide is advantageously guided within the barrel by projections formed on the slide or on the barrel and intended to slide within grooves formed on the barrel or on the slide respectively.

It is advantageous for the rack to have at least one part whose shape is not a body of revolution and which is in contact with the barrel or the slide, to prevent the rack from turning around its axis.

In an advantageous embodiment, the barrel comprises a flat part substantially parallel to the first transverse direction along which the slide is displaced, an opening passing through this flat part and communicating with the interior of the barrel, and the slide has a flat part substantially parallel to the said first transverse direction, this flat part forming an obturator, a dispensing duct being formed in the slide and having a first opening adjacent to the obturator, the obturator and the first opening of the duct being alternately opposite the opening of the barrel when the slide is in a first or in a second position respectively in relation to the barrel.

The duct is advantageously bent and has a second opening at the opposite end from the first opening and which opens along a substantially transverse direction in relation to the barrel axis.

The dosage dispenser device also comprises advantageously a shutter flap intended to obturate or release the second opening of the duct, the said shutter flap being articulated on the barrel around an axis perpendicular to the first transverse displacement direction of the slide, the shutter flap and the slide each carrying one element of a second set which comprises a second element forming a cam and a second element forming a cam follower, the initial displacement of the slide from its first position producing the cooperation of the said cam and of the said cam follower and the tilting of the shutter flap so that it releases the second duct opening.

In this case, the second element forming a cam has advantageously a cam extension intended to cooperate with the second element forming a cam follower when the slide continues to be displaced, this extension being substantially parallel to the direction of displacement of the slide in the release position of the shutter flap.

It is advantageous for the dispenser device to comprise, moreover, elastic means biasing the slide towards one of its positions in relation to the barrel. For instance, when the slide or the barrel is formed of a moulded plastic material, the elastic restoring device may be an elastic finger moulded integrally with the slide or with the barrel.

In the present patent application, the expression "transverse direction in relation to the axis of the barrel" designates a direction which is not parallel to the axis of the barrel, but which is not necessarily perpendicular to this axis. Thus, the direction of displacement of the slide and the direction of the guide surface of the first element forming a cam are both transverse in relation to the axis of the barrel and according to a characteristic of the invention, they form between them an angle which is not zero.

BRIEF DESCRIPTION OF THE DRAWINGS

To render the object of the invention more readily understood there will now be described, by way of an illustrative and non-restrictive example, one embodiment and a variant, represented in the attached drawings.

In these drawings:

FIG. 1 is a longitudinal cross-section of an example of the dosage dispenser device according to the invention. The latter comprises a cylindrical barrel 10 with a circular cross-section, having an open lower end 12 which may moreover be closed by any suitable additional means such as a small disc made of cardboard or a plastic material. The other end of the barrel is closed by an end wall 14 sloping in relation to the barrel axis. The part of barrel 10 which is adjacent to end wall 14 has a slightly reduced diameter and allows a cover cap 18 to be fitted which is only used as protection before the sale of the device. This end cover cap may then be thrown away and plays no part in the operation of the dispenser device.

End wall 14 comprises, in its central portion, a boss 20 defining a cylindrical opening with an axis parallel to the barrel axis. The cross-section of this opening may be circular or not, as will be indicated below.

The end wall 14 also has a dispensing opening 21 for the viscous product to be contained by the barrel, and fastening projections 22 whose function will be indicated below.

Figure 1:
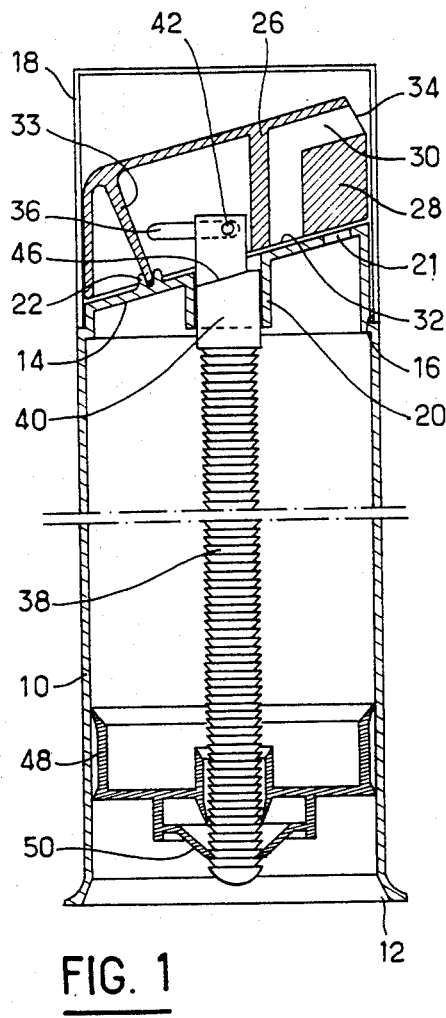
FIG. 1 is a schematic longitudinal cross-section of a dosage dispenser device according to the invention.
Figure 2:
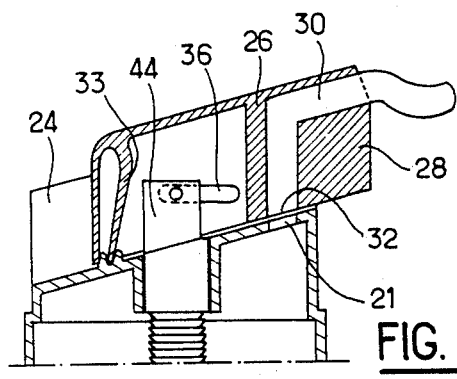
FIG. 2 is a cross-section, similar to FIG. 1, representing the top part of the device when the slide has adopted a different position.

FIG. 2, wherein a slide 26 on the end wall 14 is displaced in relation to its position in FIG. 1, shows that end wall 14 includes guides 24 defining between them a channel open towards the top and intended to accommodate a part of the slide 26. The slide 26 has a frontal part 28 wherein a duct 30 is formed. The duct 30 has a first opening 32 which, in the FIG. 2 position, is disposed opposite opening 21 of the barrel, and a second opening 34 (FIG. 1) intended to discharge the dispensed product as indicated in FIG. 2. The slide 26 comprises, moreover, two internal cutouts 36 forming cam elements or surfaces whose direction is perpendicular to the longitudinal axis of the barrel 10. Although the cutouts 36 are shown perpendicular to the barrel longitudinal axis, this characteristic is not essential. It suffices for the direction of cutouts 36 to be generally transverse to the barrel axis provided they are not parallel to the direction of end wall 14.

The dispenser device comprises, moreover, a rack 38, for instance in the form of a serrated rod fixed to a cylindrical head 40 whose outer cross-section corresponds to the cross-section of the opening in the boss 20 of the barrel. This head 40 is intended to slide in the said opening whilst preventing the viscous product from exuding between it and this boss. The part of the head 40 which is outside the barrel carries two pins 42 which serve as cam follower elements which project through the cutouts 36, the edges of the cutouts 36 serving as guide surfaces for the cam follower elements, and formed in a reduced width part 44 of the head. This part 44 is bounded at its end edges by two flattened faces 46 which, by contact with the inner surfaces of the slide 26, are intended to prevent the rack 36 from rotating around the barrel axis.

Finally, the dispenser device comprises a piston 48 slideable along the rack but only in one direction because the catches 50 only allow the piston to rise along the rack 38.

Figure 3:
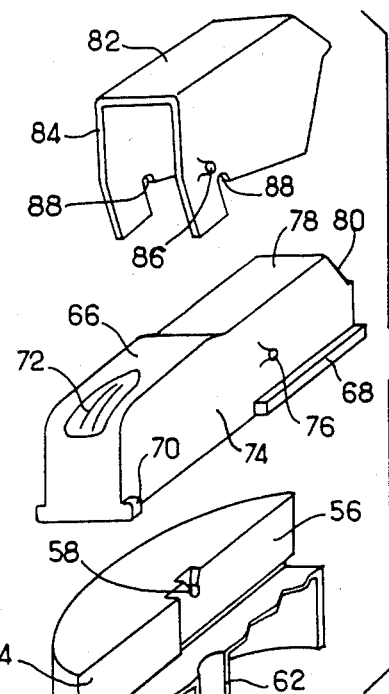
FIG. 3 is an exploded perspective of the top part of a variant of the dosage dispenser device according to the invention, comprising an obturating shutter flap.

FIGS. 1 and 2 facilitate understanding of the operation of the dispenser device according to the invention. After having taken off cap 18 at the first use, the user who wishes to dispense a dose of the product grips the barrel 10 in his or her hand and pushes the slide 26 back from the position shown in FIG. 1 to that represented in FIG. 2, for instance by means of his or her thumb. The slide 26, suitably guided by a device such as described below with reference to FIG. 3, is displaced along the sloping end wall 14 and the opening 32 of duct 30 then comes to be opposite the dispensing opening 21 of the barrel. At the same time, when the slide 26 is displaced along end wall 14, the cutouts 36 are also displaced parallel to this end 14 so that the two pins 42 which are held in the cutout come to the other end of the cutouts as shown in FIG. 2. Those second ends of the cutouts are further removed from end wall 14 than are the first ends, and as a result the rack 38 is drawn upwardly. During this movement, the catches 50 become wedged in the interdental spaces of the rack 38 so that the piston 48 is also entrained upwardly. It therefore displaces some viscous product which emerges via the dispensing opening 21 of the barrel, the inlet opening 32 of duct 30, and the discharge opening 34 thereof. The user can therefore very easily direct the stream of dispensed product onto a target, for instance a stream of toothpaste onto a toothbrush, because the target can be placed in the immediate vicinity of the hand which effects the dispensing displacement.

If the user then releases the slide 26, it will normally remain in this position. It is therefore desirable for the slide 26 or the barrel 10 to comprise elastic biasing means of any kind intended to return the slide 26 into its initial position. As shown in FIGS. 1 and 2, the slide 26 thus has an elastic finger 33 whose free end is held between the two projections 22 of end 14. This finger 33 which has been bent during the advance of the slide towards the FIG. 2 position, then has a tendency to return the slide 26 towards the FIG. 1 position. During this movement, the cutouts 36 are displaced with the slide end wall 14 so that they return the pins 42 downwardly, and as a result the rack 38 descends. During this descent, the teeth of the rack 38 easily move the catches 50 aside so that the piston does not descend.

Figure 4:
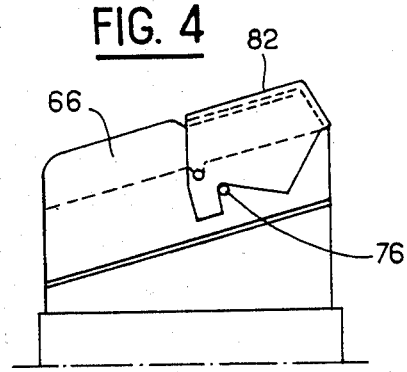
FIGS. 4 and 5 are schematic side elevations of the top part of the variant of the dispenser device of FIG. 3, in two different positions of the obturating shutter flap.
Figure 5:
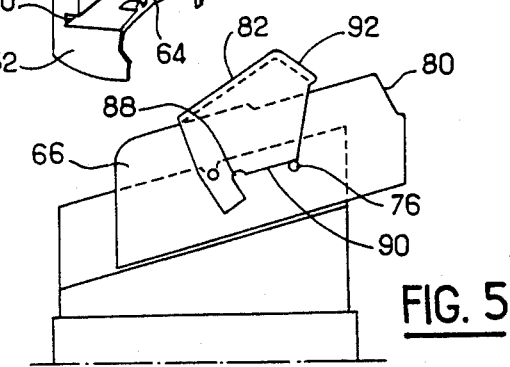

FIGS. 3 to 5 show a variant wherein an obturating shutter flap has been provided. This variant also has other characteristics which may be advantageously used in the embodiment of FIGS. 1 and 2.

More particularly, the dosage dispenser device shown in FIGS. 3 to 5 has a barrel 52 of which only half of its top part is represented in FIG. 3. This upper part delimits a channel having side walls 54, 56. The distance separating the side walls 54 is slightly greater than that of the slide which is to slide therein. On the other hand, the side walls 56 are spaced apart by a distance which is greater than the spacing of walls 54 because it is not only the slide but also a shutter flap which must be disposed between them. The walls 56 each have a cylindrical recess 58 with an upwardly flared opening to retain a pin, the said recess having an axis of symmetry perpendicular to the side wall 54 or 56 wherein it is formed.

Grooves 60 are formed in the lower portion of walls 54, 56. The barrel comprises also a rack guidance boss 62, spring retention projections 64 and a dispensing opening for the product, all similar to the corresponding elements of the embodiment of FIGS. 1 and 2.

The slide intended to slide between the barrel walls is referenced 66. It has, in the lower portion of its side walls 74, longer projections 68 and shorter projections 70 intended to slide in the guide grooves 60 of the barrel. A zone 72 of the slide 66 is advantageously knurled so as to facilitate the application of a force by a finger on the slide. The side walls 74 carry pins which serve as second cam elements 76 intended to form pivot pins, and the front portion 78 of the slide 66 is reduced in height. Moreover, an extreme front portion 80 has a slightly recessed shape as indicated in FIG. 5 so that a shutter flap 82 can be accommodated on the slide 66 as indicated in FIG. 4.

The shutter flap 82 has two side jaws 84 having outwardly projecting pins 86 intended to form pivot pins for the flap. Slots 88 in the lower edges of the shutter flap 82 form a second cam follower which is extended by a rectilinear cam surface 90 which serves as a cam extension as shown in FIG. 5. The front portion of the shutter flap 82 forms an obturator 92. As shown in FIGS. 4 and 5, the shutter flap 82 is placed on the slide 66 so that the pins 76 are accommodated in slots 88. The slide 66 is engaged in the channel delimited by the barrel, and the shutter flap 82 is then positioned by engaging the pivot pins 86 of the shutter flap 82 in the recesses 58 of the side walls 56.

There will now be described the operation of the shutter flap 82 shown in FIGS. 3 to 5. When the slide 66 is returned towards the right as viewed in FIG. 4 or 5, the pin 76 engaged in slot 88 is driven towards the right and it therefore pivots the shutter flap 82 upwards since the shutter is held by the cooperation of pins 86 with the recesses 58 of the barrel. The shutter flap is in the position shown in FIG. 5, and its front obturator 92 then allows the slide 66 to pass thereunder. The discharge opening of the dispenser duct in the slide (in the front portion 80 of the slide) is thus released because the pin 76 by cooperating with extension 90, maintains the shutter flap 82 in its raised position.

When the user has dispensed the dosed product, he or she releases the slide 66. As in the embodiment of FIGS. 1 and 2, the slide is returned elastically toward its initial position, and pin 76 slides along cam surface 90 and comes to be engaged in slot 88. Towards the end of the slide movement leftwardly as viewed in FIGS. 4 and 5, the pin 76 pushes the bottom of the slot 88 rearwardly so that the shutter flap 82 must descend and reassume the position indicated in FIG. 4.

Thus in this embodiment, not only is the dispensing opening of the barrel closed off from the dispenser duct upon return of the slide into the initial position but moreover, the discharge opening of the duct itself is shut. Thus the shutter flap 82 prevents the dispensed product from drying out.

Assembly of the apparatus is effected as follows. The slide is caused to slide in the channel formed in the upper portion of the barrel (contingently with the addition of the shutter flap). The rack is then introduced from below through the lower end 12 of the barrel 10 so that its pins come to engage in the cutouts 36. Then the apparatus is inverted and filled with the product to be dispensed. The piston is then fitted on the rack. The bottom 12 of the barrel may possibly be closed by a disc made of cardboard or of a plastic material.

The dosage dispenser device according to the invention is formed by a small number of elements which are robust and inexpensive. Its main advantage is that it allows the product to be dispensed with only one hand and at a location near the hand holding the dosage dispenser device steady. In this way, the dispensed product is very conveniently directed onto a target. Moreover, the automatic closure ensures the conservation of the product under optimum conditions without any need for the user to effect the least additional movement.

It shall be duly understood that the dosage dispenser apparatus described above may give rise to any desirable modification without thereby departing from the scope of the invention. For instance, the piston and rack system may be of other types provided the operation can be obtained by reciprocating displacement of the rack 38 parallel to its axis.

Although it has been indicated that the rack carries pins forming cam contact pieces intended to slide in the cutouts 36 forming the cam surfaces, the arrangement may be reversed. More particularly, the slide may comprise elongated projections intended to be displaced in grooves formed in the head of the rack. This arrangement will also prevent the rack from rotating around its axis. This rotation may also be prevented by using a rack and a projection 20 with a non circular cross-section.

It has been indicated that the return of the slide was ensured by an elastic finger integral with the slide. The restoring device may of course, also be integral with the barrel since the restoring force must be exerted between the slide and the barrel. However, an independent spring may also ensure this return.

It is very advantageous that the various elements described are formed of a moulded plastic material by implementation of well known technology.

I claim:

1. In a dosage dispenser device for a viscous product comprising:
   (a) a cylindrical barrel having a longitudinal axis and intended to contain a viscous product to be dispensed;
   (b) a piston slidable in a leakproof manner in the barrel;
   (c) a rack disposed in the barrel;
   (d) means mounting the rack on the barrel for displacement parallel to the axis of the barrel between first and second positions;
   (e) actuating means intended to displace the rack between its said first and second positions, said actuating means having outlet means associated therewith; and
   (f) catch means integral with the piston and mounted on the rack intended to transmit the displacements of the rack to the piston when the rack is displaced in a first direction along its length and to slide along the rack when the rack is displaced in the reverse direction; the improvement wherein
   (a) the actuating means for the rack comprise a slide mounted for displacement in translation in a first transverse direction having a first slope in relation to the barrel longitudinal axis; and
   (b) the dosage dispenser device further comprises a first cam element and a first cam follower element, the cam element having a guide surface which is disposed in a second transverse direction having a second slope in relation to said longitudinal axis of the barrel, wherein the second slope is different from the first, and one of said first cam element and first cam follower element is integral with the slide and the other of said first cam element and first cam follower element is integral with the rack, said barrel comprising
      (i) a flat wall substantially parallel to the first transverse direction along which the slide is displaced;
      (ii) a dispensing opening traversing said flat wall and opening out of the interior of the barrel; and wherein the slide has
      (iii) a flat part substantially parallel to the said first transverse direction and forming an obturator for said dispensing opening of the barrel; and
      (iv) a dispenser duct formed in the slide and having a first opening adjacent to said obturator, said obturator and the said first opening of the dispenser duct being alternately opposite said dispenser opening of the barrel when the slide is in a respective one of a first slide position and a second slide position in relation to the barrel.

2. A dosage dispenser device according to claim 1, wherein said dispenser duct is bent and has a second opening at the opposite end from said first opening, said second opening defining an exit along a substantially transverse direction in relation to said longitudinal axis of the barrel.

3. A dosage dispenser device according to claim 2, further comprising a shutter flap intended to alternately obturate and release said second opening of the dispenser duct and means articulating said shutter flap on said barrel around an axis perpendicular to the first transverse direction of displacement of slide, a second cam element on the one of said shutter flap and the slide and a second cam follower element on the other of said shutter flap and said slide, whereby initial displacement of the slide from said first slide position produces the cooperation of the second cam element and the second cam follower element and pivoting of the shutter flap to release said second opening of said dispenser duct.

4. A dosage dispenser device according to claim 3, wherein said second cam element comprises a cam extension intended to cooperate with the second cam follower element during subsequent displacement of the slide towards said second slide position, said cam extension being substantially parallel to the direction of displacement of the slide when the shutter flap is in a position corresponding to release of said second opening of the dispenser duct.

* * * * *